United States Patent
Flake

(10) Patent No.: US 10,902,459 B2
(45) Date of Patent: Jan. 26, 2021

(54) FACILITATING SMART ADVERTISING ON CURATED CONTENT-BASED NETWORKING WEBSITES IN AN ON-DEMAND SERVICES ENVIRONMENT

(71) Applicant: salesforce.com, inc., San Francisco, CA (US)

(72) Inventor: Gary Flake, Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 804 days.

(21) Appl. No.: 14/511,037

(22) Filed: Oct. 9, 2014

(65) Prior Publication Data
US 2015/0186931 A1    Jul. 2, 2015

Related U.S. Application Data

(60) Provisional application No. 61/922,312, filed on Dec. 31, 2013.

(51) Int. Cl.
*G06Q 30/02*    (2012.01)

(52) U.S. Cl.
CPC ..... *G06Q 30/0247* (2013.01); *G06Q 30/0277* (2013.01); *G06Q 30/0251* (2013.01)

(58) Field of Classification Search
CPC .................................................. G06Q 30/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Vincent M Cao
(74) *Attorney, Agent, or Firm* — Jaffery Watson Mendonsa & Hamilton LLP

(57) ABSTRACT

In accordance with embodiments, there are provided mechanisms and methods for facilitating smart advertising on curated content-based networking websites in an on-demand services environment in a multi-tenant environment according to one embodiment. In one embodiment and by way of example, a method includes receiving a request for advertisement on a website, where the request may be received from an advertising organization. The method may further include estimating one or more factors relating to the advertisement, computing, based on the estimation, expected revenue relating to the advertisement, and placing the advertisement on the website based on the expected revenue.

21 Claims, 8 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,822,636 B1 * | 10/2010 | Ferber .................... G06Q 30/02 705/14.4 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0093327 A1 * | 5/2004 | Anderson .............. G06Q 30/02 |
| 2004/0128001 A1 | 7/2004 | Levin et al. |
| 2004/0186860 A1 | 9/2004 | Lee et al. |
| 2004/0193488 A1 * | 9/2004 | Khoo ..................... G06Q 30/02 705/14.52 |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0132453 A1 * | 5/2009 | Hangartner ....... G06F 17/30053 706/46 |
| 2010/0138452 A1 * | 6/2010 | Henkin .................. G06Q 30/02 707/803 |
| 2010/0217648 A1 * | 8/2010 | Agarwal ................ G06Q 10/04 705/7.31 |
| 2011/0231241 A1 * | 9/2011 | Kesari .................... G06Q 30/02 705/14.42 |
| 2012/0197733 A1 * | 8/2012 | Skomoroch ........... G06Q 30/02 705/14.66 |
| 2012/0311623 A1 * | 12/2012 | Davis ..................... H04N 5/765 725/18 |
| 2013/0161381 A1 * | 6/2013 | Roundtree ......... G06Q 30/0207 235/375 |
| 2013/0290110 A1 * | 10/2013 | LuVogt ............... G06F 16/9535 705/14.66 |
| 2013/0339180 A1 * | 12/2013 | LaPierre ................ G06Q 50/01 705/26.7 |
| 2014/0067539 A1 * | 3/2014 | Burt .................. G06Q 30/0259 705/14.57 |
| 2014/0081950 A1 | 3/2014 | Rajan et al. |

\* cited by examiner

FACILITATING SMART ADVERTISING ON CURATED CONTENT-BASED NETWORKING WEBSITES IN AN ON-DEMAND SERVICES ENVIRONMENT

CLAIM OF PRIORITY

This application claims the benefit of and priority to U.S. Provisional Patent Application No. 61/922,312, entitled "Sponsored Pin Advertising" by Gary W. Flake, filed Dec. 31, 2013, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating smart advertising on curated content-based networking websites in an on-demand services environment.

BACKGROUND

Despite an exponential growth in social networking websites and online advertising, websites have lacked smart advertisement models. For example, most conventional advertising models have lacked techniques to generate smart advertisements or sponsored contents that are capable of being displayed in a manner as to take maximum advantage of the scope of growth that such websites have to offer.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
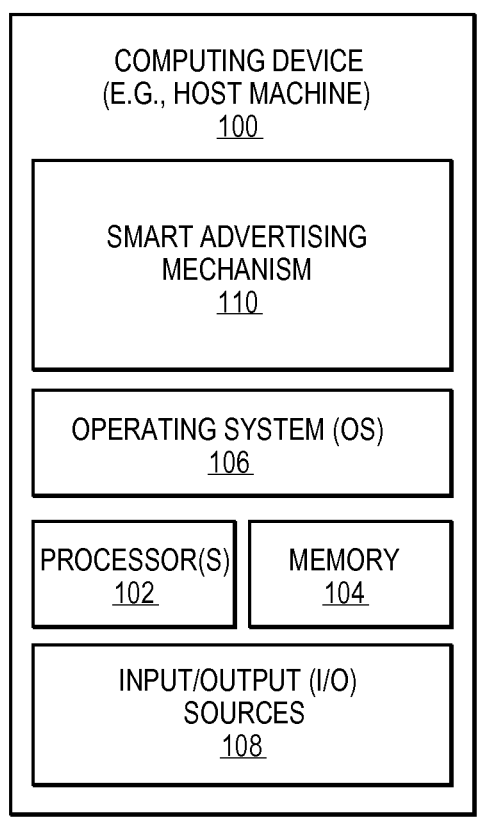
FIG. 1 illustrates a computing device employing a smart advertising mechanism according to one embodiment.

In accordance with embodiments, there are provided mechanisms and methods for facilitating smart advertising on curated content-based networking websites in an on-demand services environment in a multi-tenant environment according to one embodiment. In one embodiment and by way of example, a method includes receiving a request for advertisement on a website, where the request may be received from an advertising organization. The method may further include estimating one or more factors relating to the advertisement, computing, based on the estimation, expected revenue relating to the advertisement, and placing the advertisement on the website based on the expected revenue.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating smart advertising on curated content-based networking websites in an on-demand services environment in a multi-tenant environment according to one embodiment.

Embodiments provide for tools and/or techniques for facilitating smart advertising on curated content-based networking websites, such as Pinterest.com® (or simply referred to as "Pinterest®"). For example, Pinterest®, is known to have enabled its users (also referred to as "participants") to collect and organize contents in a personalized online space, such as "pinboards" (or simply "boards") having pins, where the users are capable of sharing their own pins/boards or browsing other users' pins/boards as well as have other forms of social interactions, such as liking, following, commenting, etc. Embodiments provide for tools and/or techniques to generate smart advertisements for products, services, etc., and/or other sponsored contents (e.g., announcements, promotions, coupons, public calls, etc.) that are capable of being smartly placed on various curated content systems, taking maximum advantage of the growing scope and influence of such systems, such as Pinterest®.

Embodiments provide for facilitating smart advertising based on a chain of conditional probabilities or factors, such as (without limitation and not necessarily in this order): 1) estimating probability of relevance to determine whether an advertisement is relevant to a webpage or, more specifically, a collection of pins; 2) computing action rate of the advertisement based on the probability of relevance; and 3) determining cost per action for the advertisement. In one embodiment, any combination of the aforementioned factors may be used to obtain the expected revenue (also referred to as "revenue optimization") for the advertisement. Stated differently, these probabilities may be put together to be expressed in an equation as follows: Expected Revenue=Probability of Relevance*Action Rate*Cost of Action.

It is contemplated that any number and type of techniques (e.g., statistical techniques, estimation techniques, computation tools, etc.) may be employed and used to determine expected revenues relating to one or more advertisements to be placed on one or more websites using the aforementioned equation. It is further contemplated and to be noted that embodiments are not limited to any particular type of systems (such as curated content-based systems, etc.) or websites (such as Pinterest.com®, etc.); however, merely for the sake of brevity, clarity, and ease of understanding, curated content-based systems/websites, such as Pinterest.com®, etc., are focused and discussed throughout this document.

Since websites may be accessed from any number and type of computing devices, any advertisements on these websites may also be accessed, viewed, and/or heard via any number and type of computing devices, such as server computers, desktop computers, laptop computers, tablet computers, smartphones, wearable devices, touch-enabled devices, etc., based on any number and type of operating systems, such as Apple® iOS®, Android®, etc. It is contemplated that embodiments are not limited to merely commercial advertisements and that embodiments may be applied to and used with any amount and type of other sponsored contents (such as announcements, promotions, coupons, public calls, election calendars, weather warnings, amber alert, etc.); however, merely for the sake of brevity, clarity, and ease of understanding, commercial advertisements for products, services, etc., are focused and discussed throughout this document.

For example, a business, such as a florist, may want to advertise to users of curated content-based systems, but conventional advertising techniques lack any advertisement model to take proper advantage of advertising on such systems. For example, in an on-demand services environment, an advertiser may select content to be displayed alongside the curated content on a curated content-based website. In one embodiment, for a curated content website like Pinterest.com®, the advertiser may bid on tags, such as pin- or board-like spaces, that are included in the webpage's primary content, but the advertiser may also bid on the co-occurrence of a sponsored pin advertisement ("SPA") (also referred to as "sponsored pin", "pin advertisement", "sponsored board advertisement", "sponsored board", "board advertisement", "smart advertisement" or simply "advertisement" or "ad") along with other content pins and/or boards having one or more relevant tags. Accordingly, in one embodiment, the advertisement pin may be selected to be displayed alongside other content pins based on the expected revenue of the advertisement pin to the aggregate collection of the curated content (such as "board" on Pinsterest.com®). For example, an image of 1-800-Flowers® (also referred to as "1800Flowers.com®") may be embedded on or next to a board with an offer or coupon along with other content pins that have been tagged as being about flowers or tagged as #flowers, etc.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

In conventional models, index tables are severely limited in that an index table can only be created, for example, by a limitation of up to two columns and each column with up to three data types. As a result, a large number of index tables and/or skinny tables are required to be created and maintained and further, when they are relied upon for reference (such as when customer queries are to be processed) which can all be expensive, inefficient, and not scalable.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a smart advertising mechanism 110 according to one embodiment. In one embodiment, computing device 100 serves as a host machine for employing smart advertising mechanism ("smart mechanism") 110 for facilitating dynamic generation and deployment of smart advertisements on websites in a multi-tiered, multi-tenant, on-demand services environment.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution (such as an educational institution), an agency (such as a government agency), etc.) serving as a customer or client of a host organization or service provider (e.g., Salesforce-.com®) of smart mechanism 110. The term "user" may also refer to an organization's representative (e.g., someone who works on behalf of the organization), such as a salesperson, a sales manager, a product manager, an accountant, a director, an owner, a president, a system administrator, a computer programmer, an information technology ("IT") representative, etc.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Computing device 100 may include one or more server computers (e.g., cloud server computers, etc.), desktop computers, cluster-based computers, set-top boxes (e.g., Internet-based cable television set-top boxes, etc.), and the like. Computing device 100 may also include client computers, such as mobile computing devices, such as cellular phones including smartphones, handheld computing devices, personal digital assistants ("PDAs"), etc., tablet computers, laptop computers, e-readers, media Internet devices ("MIDs"), smart televisions, television platforms, wearable devices (e.g., glasses, watches, bracelets, smartcards, jewelry, clothing items, etc.), media players, Global Positioning System ("GPS")-based navigation systems, cable setup boxes, etc.

Computing device 100 includes an operating system ("OS") 106 serving as an interface between any hardware or physical resources of the computing device 100 and a user. Computing device 100 further includes one or more processors 102, memory devices 104, network devices, drivers, or the like, as well as input/output ("I/O") sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request" and "message" may be used interchangeably throughout this document.

Figure 2:
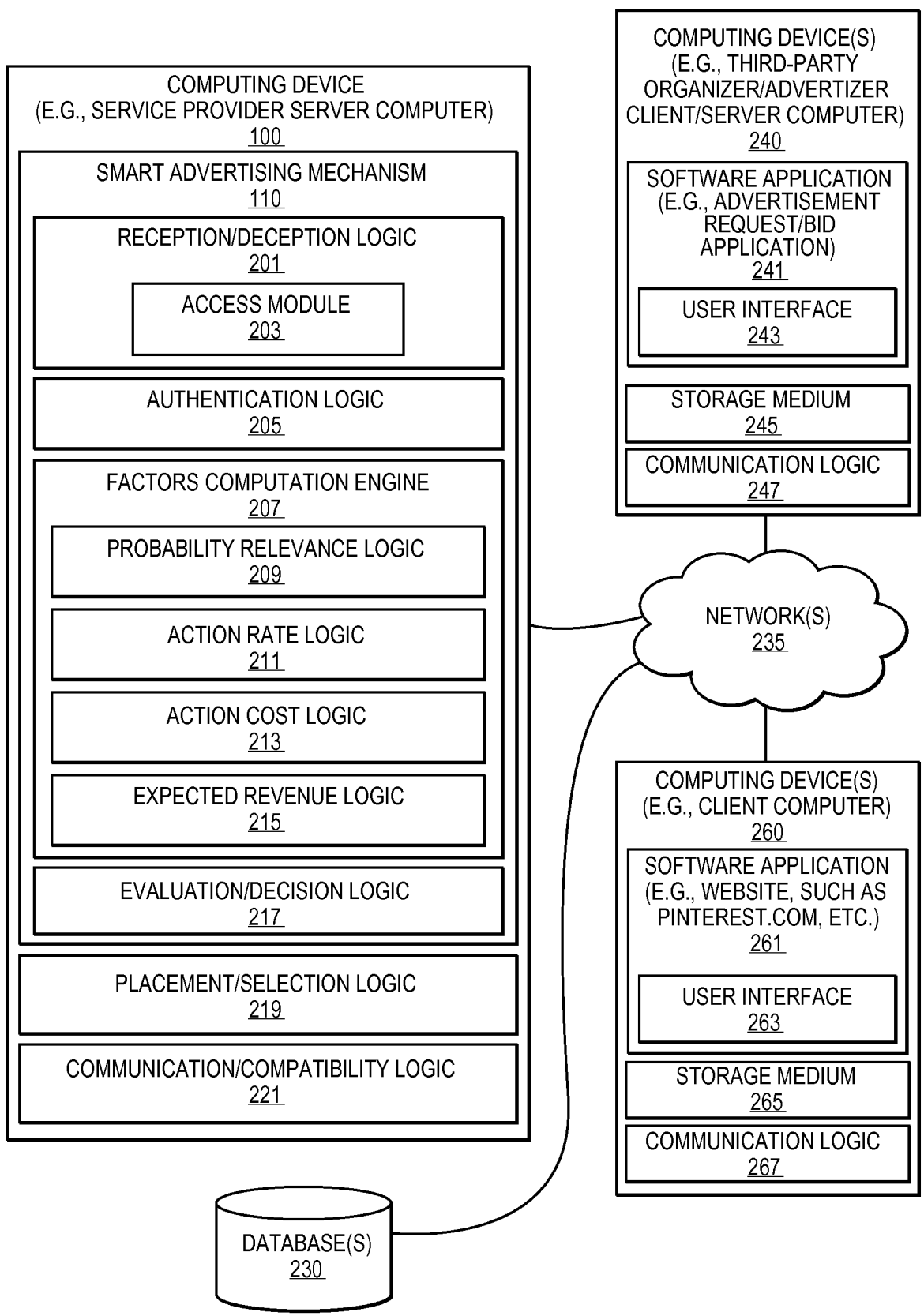
FIG. 2 illustrates a smart advertising mechanism according to one embodiment.

FIG. 2 illustrates a smart advertising mechanism 110 according to one embodiment. In one embodiment, smart mechanism 110 may include a number of components, such as (without limitation and not necessarily in this order): reception/detection logic 201 having access module 203; authentication logic 205; factors computation engine ("computation engine") 207 including probability relevance logic ("relevance logic") 209, action rate logic 211, action cost logic 213, and expected revenue logic ("revenue logic") 215; evaluation/decision logic 217; placement/selection logic 219; and communication/compatibility logic 221.

In one embodiment, computing device 100 may include a server computer which may be further in communication with one or more databases or storage repositories, such as database(s) 230, which may be located locally or remotely over one or more networks, such as network(s) 235 (e.g., cloud network, Internet, proximity network, intranet, Internet of Things ("IoT"), Cloud of Things ("CoT"), etc.). Embodiments may not be limited to any particular type of data storage repositories or any particular amount or type of contents stored at such repositories. However, as an example and for the sake of brevity, clarify, and ease of understanding, throughout the document, database(s) 230 may be regarded as a data storage repository for storing and maintaining any amount and type of contents or data, such as data relating to advertisements, advertising organizations, advertisement costs, clients, client curated content websites, website display material-related content (e.g., organization names, product names, domain names, co-domain names, etc.), and the like.

Computing device 100 is further shown to be in communication with any number and type of other computing devices, such as computing devices 240, 260, over one or more networks, such as network(s) 235. For example, computing device(s) 240 may include one or more third-party client and/or server computers, such as a third-party server computer, associated with or hosted by a third-party organization (also referred to as "advertising organization", "advertising agency", "advertising vendor", or simply "advertiser") seeking to advertise its products, services, announcements, etc., on one or more curated content-based websites (e.g., Pinterest.com®), such as software application 261, as facilitated by smart mechanism 110 over network 235. It is to be noted that terms like "curated content-based website", "curated content-based system", "curated content website", "curated content system", "curated website", "curated system", or simply "website" may be referenced interchangeably throughout this document.

In one embodiment, computing device 240 may host advertisement request/bidding application 241 which offers one or more user interfaces, such as user interface 243, which may be used by a user (referred to as "representative", such as an advertising executive, a sales representative, a system administrator, etc.) representing the advertiser (e.g., organization, such as a business, company, institution, agency, etc.) to place a request and/or a bid for seeking to advertise on a website via software application 261. As will be further discussed, this request/bid may be received, over network(s) 235, at reception/detection logic 201 to then be processed by other components of smart mechanism 110. Computing device 240 may further include storage medium 245 and communication logic 247.

Computing device(s) 260 may include one or more client computers (e.g., desktop computers, mobile computers, etc.) hosting one or more software applications 261, such as curated content websites (e.g., Pinsterest.com®, etc.), to display one or more advertisements or sponsored contents associated with one or more advertisers and as processed by smart mechanism 110. For example, any advertisements within and along with other contents of the webpage may be viewed by the user (also referred as "end-user") via user interface 263 (e.g., Internet browser, etc.) as provided by software application 261 at computing device(s) 260. Computing device(s) 260 may further include storage medium 265 and communication logic 267.

Throughout this document, terms like "logic", "component", "module", "framework", "engine", "tool", and "builder" may be referenced interchangeably and include, by way of example, software, hardware, and/or any combination of software and hardware, such as firmware. Further, any use of a particular brand, word, or term, such as "advertisement", "sponsored content", "pin advertisement", "SPA", "sponsored pin", "board advertisement", "sponsored board", "curated content" or "curated content website", "website", "Pinterest®" or "Pinterest.com®", "pin", "board", "tag", "bid", "relevance" or "probability of relevance", "action", "action rate", "action cost" or "cost of action", "revenue" or "expected revenue", etc., should not be read to limit embodiments to software or devices that carry that label in products or in literature external to this document.

As aforementioned, embodiments are not limited to a particular website or system; however, for the sake of brevity, clarity, and ease of understanding, throughout this document, Pinterest.com®, which is regarded as curated content networking website, is used as an example. Since Pinterest® is a well-known company and Pinterest.com® being its website, many of the generally-known details about the company and/or the website are not discussed here. Nevertheless, to provide some relevant knowledge, Pinterest.com® refers to a website that allows its users to collect ideas, do projects, plan for events, pursue interests, etc., by creating, collecting, sharing, etc., any number and type of visual bookmarks, known as "pins", which are then placed on collection areas (typically rectangular in shape) known as "pinborads" or simply "boards". Each user profile may have any number and type of boards and each board may have any number and type of pins.

Further, these boards may hold a collection of pins relating to contents obtained from any number and type of sources, such as networking websites, vendor websites, advertisements, public and/or private webpages, etc. The interest or content areas relating to these boards may vary a great deal from simple interests (e.g., cooking, movies, sports, etc.) to sub-interests (e.g., cooking seafood, mystery movies, baseball, etc.) to planning events (e.g., buy clothes and groceries for a party, reserve a hall and purchase flowers for a wedding, book a hotel room and buy a couple of books for the upcoming trip, purchase camping equipment and reserve a camping site for camping, etc.), etc.

Given the diversity of interests that users are able to harness on a curated content website like Pinterest.com®, each of its boards (e.g., wedding, food, etc.) and the relevant pins (e.g., 1800flowers.com, seafood, etc.) and their associated tags (#flowers, #atlanticsalmon, etc.), primary web domains (e.g., primary websites/systems representing the origin of pins), secondary web domains (secondary websites/systems facilitating or adopting the pins), etc., may be considered suitable and ripe for any number and type of advertisements. Since most users of curated content-based websites are expect to regularly browse their own as well as other users' contents (e.g., boards, pins), there is an even greater revenue potential and business sense in advertising smartly and effectively on such websites.

It is contemplated that embodiments are not limited to any particular visual or display advertising model, such as banner advertising model, embedded advertisement model, contextual model, flashing model, etc., and that any one or more visual/display advertising models or any combination thereof may be partially or fully employed. For example, in some embodiments, when advertising on Pinterest.com®, an advertisement may be similar in display to a pin, a board, or a combination thereof.

With regard to Pinterest®, it is contemplated that any number and type of pins associated with a user profile may come from specific primary and/or secondary web domains or be associated with specific tags, etc. Stated different, in some embodiments, there is any number ways to slice this universe of pins through smart advertisement as facilitated by smart mechanism 110 based on one or more general factors, such as (without limitation) user profile, general user interests, user's groups or associations, pin/board titles or names indicating user interests, domain origination of pins, tags associated with pins, even temporary relevant of one or more interests, like a one-time wedding or camping event, etc.

Further, in one embodiment, a set of other specific factors (e.g., probability of relevance, action rate, cost of action, expected revenue, etc.) may be determined and considered as discussed with reference to computation engine 207. Further, continuing with the example of Pinterest®, any number and type of other functions and characteristics that are specific to Pinterest®, such pining, repining, navigating between boards, navigating between users, liking, following, sharing, sending, editing, etc., may be accessed via access module 203 which may then be dissected to obtain more precise and relevant information (such as behavior of a particular user, historical data relating to pinning or repining of a pin relating to a particular product, service, etc.) that may then be used in determining one or more of the aforementioned factors (e.g., probability of relevance, action rate, etc.).

In the illustrated embodiment, the user of computing device 260 may access one or more curated content websites, such as Pinterest.com®, via user interface 263 of software application 261. At computing device 240, an advertising organization (e.g., business, company, educational institution, government agency, etc.) may wish to advertise its products and/or services to the user of computing device 260 via software application 261 (e.g., website, such as Pinerest.com®) as facilitated by smart mechanism 110 at computing device 100. In one embodiment, the advertising organization may place a request or bid for placing an advertisement, via user interface 243 of software application 241, which may then be communicated to smart mechanism 110 over network 235 and via communication logic 247 and communication/compatibility logic 221. The request/bid may be received at reception/detection logic 201. It is contemplated that the request/bid may be placed by any number and type of advertisers and each advertiser may place any number and type of advertisement requests for promoting their products and/or services at any number of websites at any number and type of computing devices and therefore it is to be noted that embodiments are not limited to merely the illustrated computing devices 240, 260 or software applications 241, 261 or their respective users/organizations or the like.

In one embodiment, upon receiving the request, the advertiser, the user placing the request on behalf of the advertiser, computing device(s) 240, etc., may be authenticated and verified by authentication logic 205 using any number and type of authentication tools and techniques, such as verifying and authenticating user/device identification ("user ID"), password, signature, fingerprint, private cryptographic key, public cryptographic key, etc. In some embodiments, a new user or advertiser or the associated computing device may be requested to register by providing relevant data (e.g., name, title, employee number, organization name, unique ID, etc.) prior to placing their request for advertisement. Upon successful registration and/or authentication, the advertiser may then be allowed to place the request.

Once the reception/detection and authentication processes are performed and completed by reception/detection logic 201 and authentication logic 205, the process may then continue with computation engine 207. As aforementioned, certain data (such as characteristics, functionalities, and/or contents etc.) may be continuously and dynamically detected and accessed at and from various websites (such as Pinterest.com®) by reception/detection logic 20 and its access module 203, respectively. For example, if an end-user, via computing device 260, pins or re-pins an interest, creates or modifies a board, browse or selects pins from various boards of other users, etc., at Pinterest.com®, each of these activities of the end-user may be detected by reception/detection logic 201.

In one embodiment, these activities may then be accessed by access module 203 for further investigation in order to acquire a more relevant set of data relating to each activity, such as determining primary and/or secondary web domains associated with each pin, tag, etc. For example, a pin relating to flowers at a board named "wedding" or under a tag named #flowers may have been obtained directly from a primary website associated with a primary domain (e.g., flower vendor's website, such as 1800Flowers.com®, etc.), a secondary or tertiary website associated with a secondary or tertiary domain (e.g., other vendors or participants' websites, such as a magazine website like Vogue.com®, etc.), etc. Such website-related activities and their relevant data may be accessed by access module 203 may then be used by computation engine 207 for further processing.

In some embodiment, advertisers may voluntarily, or upon requested, provide relevant information that may then be used for advertisement bidding and placement purposes by computing engine 207, evaluation/decision logic 217, and placement logic 219. It is contemplated that any number and type of basic techniques for buying, selling, bidding, etc., may applied and used as base techniques and as such these techniques are not discussed here. In one embodiment, advertisers may voluntarily or in accepting an offer communicate their purchase/bidding offers, such as their overall budget for a particular advertisement campaign, payment schedule, maximum or minimum cost they are willing to pay per advertisement, per period of advertisement, per website, etc. Such communications between advertisers (associated with computing device 240) and the service provider (such as Salesforce.com® hosting smart mechanism 110) may be performed in any number of ways, such as over network(s) 235.

In one embodiment, computation engine 207 may be used to estimate one or more factors that may then be used to determine the expected revenue relating to one or more advertisements of products, services, etc., such that each advertisement and/or advertiser may be considered and ranked based on the expected revenue using the following formula: Expected Revenue=Probability of Relevance*Action Rate*Cost per Action. For example and in one embodiment, relevance logic 209 may be used to estimate a probability of relevance and similarly, action rate logic 211 may be used to estimate an action rate, while action cost logic 213 may be used to estimate a cost of each action. Moreover, revenue logic 215 may be used to determine and estimate the expected revenue relating to each advertisement, advertisement campaign, advertiser, website, etc.

In one embodiment, relevance logic 209 may be used to compute relevance and, more specifically, a probability of relevance as it may relate to each advertisement placed on a website. For example and in one embodiment, the probability of relevance may be estimated, via relevance logic 209, by a degree of overlap between the bids for sponsored pin advertisements and the properties within the aggregate collection. Thus, for example, at Pinterest.com®, a collection of pins with a single occurrence of a tag, like #gardening, may have relevance to advertisers who are flower shops/vendors (e.g., 1800Flowers.com®), but another tag, like #flowers, may be regarded as having much more relevance or a higher probability of relevance to a florist's SPA than to a gardening supply centers' SPA.

In one embodiment, a variety of factors may be taken into consideration in estimating the probability of relevance as facilitated by relevance logic 209. For example, a florist may seek to attract new customers who are in the market for purchasing flowers and thus, the florist may choose to bid on a number of relevant tags, such as #flower, #wedding, #dating, etc., but the florist may also wish to bid for the right to co-occur with various pins that may have originated from a specific relevant domain (e.g., 1800Flowers.com®, Ftd-.com®, etc.) relating to other florists or similar vendors, etc., making it similar to display their advertisement.

Now, for example, when a user logs into Pinterest.com® and visits a collection of pins, such as those pins that have domains and/or tags associated with them, a minimum of a title and/or description may then be used as a proxy or a tag. When such collection of pins is viewed, using various factors (such as the probability of relevance as estimated via relevance logic 209, action rate as estimated via action rate logic 211, action cost as estimated via action cost logic 213, etc.) may be considered or pooled into estimating expected revenue as estimated by revenue logic 215 of computation engine 207. In some embodiments, these expected revenues may then be used by placement/selection logic 219 to rank or list various advertisements to be put in queues or placed in groups as will be further described with reference to placement/selection logic 219.

Further, in some embodiments, various other elements, such as properties, traits, patterns, tracks, keywords, etc., associated with different entities, such as users, websites, etc., along with any relevant historical data, may be taken into consideration, individually or collectively, when estimating the probability of relevance. For example, repining is a well-known trait on Pinterest.com® and nearly 80% of pins are believed to be repins, where a repin may indicate that its content may not have been originally intended by the user and that it was unintentionally found or discovered via a secondary source, such as a vendor website or another user's board, and after having discovered the content, it is liked by the user who then chooses to repin it. Stated differently, repinings on Pinterest® may be regarded as a bonus traffic and considered as such by relevance logic 209, because each repin may involve content that was neither intended by the user nor part of the user's collection of pins and yet it ended up being repinned.

As aforementioned, when estimating the probability of relevance, many of the factors may be taken into consideration individually (such as an individual pin) and/or collectively (such as an entire board of pins). For example, it is contemplated that on a typical Pinterest.com® webpage, there may be a number of boards having a number of pins, such as relating to any number and type of domains, tags, etc., such as photo.com, camera.com, Amazon.com®, #flowers, #dating, etc., and that in one embodiment, some or all of them may be taken into consideration to achieve an even finer probability of relevance. For example, this collective consideration of the union of data, such as pins, etc., may lead to achieving any number and type of aspects or dynamics which may then be further reviewed to obtain a better probability of relevance.

Such an aspect, for example, may include (without limitation) obtaining and then matching a degree of similarity between desired traits that the advertiser may have specified or may be seeking to achieve and an aggregate of properties or traits obtained from the overall trend of the reviewed pins, boards, historical data, etc. This matching or comparing of similarities, in one embodiment, may be performed by relevance logic 209 using any number and type of similarity comparing/matching techniques, such as (without limitation and not necessarily in this order): 1) Jaccard Index (also referred to as "Jaccard Similarity Coefficient") for comparing similarity and diversity of the sets of pins; 2) term frequency-inverse document frequency ("tf-idf") to show, via numerical statistics, how important is a word to an entire document in a corpus or collection of data (e.g., pins); and 3) web search relevance, etc. For example and in one embodiment, in applying the Jaccard Index by relevance logic 209, any intersections between the contents associated with the pins and the overall traits may be obtained on a scale of 0-1, such a score of 1 may be assigned to a comparison that yields a match, and a score of 0 may be assigned to a comparison that does not yield a match.

Similarly, for example, the tf-idf technique may be employed by relevance logic 209 to obtain a measure or weight of each word with respect to other words in the corpus. For example, using the tf-idf technique, when searching for a term like "cat in the hat", the words like "in" and "the" may be regarded as commonly and frequently occurring words in the corpus (as opposed to the words "cat" and "hat") and thus, an inverse document frequency factor of tf-idf is employed to diminish the weight assigned to such frequently-occurring common words (e.g., in, the) in favor of other relatively uncommon and rarely occurring words (e.g., cat, hat) whose assigned weight is increased.

In one embodiment, via relevance logic 209, if one advertiser is bidding on a word "camera" and "recorder" while another advertiser is bidding on "Canon® EOS Rebel™", it is contemplated that finding "Canon® EOS Rebel™" would be much rarer than finding "camera" and/or "recorder" and thus, matching the exact or near term like "Canon® EOS Rebel™" would carry a far greater probability of relevance because the properties it matches are much rarer than simply matching more generic and commonly occurring words like "camera" and "recorder". This technique may also be used and applied using web search relevance.

In one embodiment, action rate logic 211 may be used to determine a rate of action or simply "action rate" for each advertisement that is to be placed on a website (e.g., curated content website, such as Pinterest.com®), where action rate may refer to the frequency in which an impression of an advertisement elicits an action, such as clicks, re-pins, transactions, visits to the advertiser's website, making a purchase at the advertiser's website, etc. Initially, when advertiser, advertisement content, product and/or service, website, etc., may still be new such that not much data may be available to accurately compute action rate for such an advertisement, in one embodiment, action rate logic 211, in such cases, may intelligently consider and review any other data, such as any historical data relevant to the advertisement, the advertiser, product or service, the website, etc., to compute the action rate.

For example, if it is known that historically, advertisement pins relating to consumer electronic items generate an action rate of 10% on Pinterest.com® and no other data is available or known, then, action rate logic 211 may start with this historical information as a proxy for consumer electronic items-related advertisement pins placed on Pinterest.com®. However, as additional data is collected and becomes available for a particular product, service, advertiser, website, or the advertisement itself, action rate logic 211 may automatically and dynamically reduce the use and importance of any historical data in favor of the newly-collected data. It is contemplated that in one embodiment, a pre-determined policy (e.g., as determined by the service provider, such as Salesforce.com®) may be applied to continue to consider and include at least some of the available relevant historical data (such as based on a certain percentage, relevance/importance, date/age, etc.) in order to accurately compute the action rate. For example, per a predefined policy, in one embodiment, a fixed 30% of the overall data may be historical data and, in another embodiment, this percentage may be dynamically estimated based on a moving scale or weighted average (e.g., reducing the percentage by 5% each month) as other data is continuously collected and considered for action rate estimation by action rate logic 211.

With regard to cost per action (or simply "action cost") estimation, in one embodiment, action cost logic 213 may be used to determine the cost per action as it relates to each advertisement (e.g., advertisement pin being placed on Pinterest.com®, etc.) based on any number and type of factors, techniques, criteria, and historical data, etc. As with other factors, embodiments are not limited to any particular technique for estimating action costs and that any number and type of computation or negotiation techniques may be applied and used for action cost estimation. Further, it is contemplated that the cost per action may differ for each action as it relates to each advertisement, website, advertiser, etc., and further, it may differ for each advertisement, product, service, advertiser, website, time of day or hour-by-hour, period/time of year (e.g., Christmas, Black Friday, etc.), country-by-country or region-by-region, etc.

For example, in one embodiment, some advertisers may request and/or be offered a flat rate deal, such as by disclosing an overall advertisement budget that the advertiser is willing to spend on an advertisement campaign (e.g., a 3-month advertisement campaign for daily placement an advertisement on a particular website), the advertiser may be offered certain return expectations by the service provider (e.g., Salesforce.com®). Such expectations may include an estimated action rate (e.g., clicks, re-pins, etc.) that the advertiser may expect to get for each advertisement at a particular website, such as placing an advertisement board for Home Depot® on Pinterest.com®. Having known the exact advertisement budget, calculations may be performed based on any number and type of factors (e.g., advertisement content, product, service, advertiser, time of day, region, time of year, etc.) to derive the action cost for the benefit of, for example, the advertiser (e.g., Home Depot®, etc.) and by having the action cost (as it relates to each action or impression initiated by the user), a fair estimate of the potential revenue may also be obtained as facilitated by revenue logic 215 of computation engine 207.

In some embodiments, other more complex cost estimation techniques may be applied and used for computing action costs as facilitated by action cost logic 213. For example, a consumer electronics vendor/advertiser, such as Best Buy®, may choose to agree (e.g., bid, request, place an offer, accept an offer, etc.) to pay a fix cost (e.g., $1.00) for their camera-related pin advertisements on Pinterest.com® each time the advertisement is displayed near where the word "camera" is mentioned in some context, such as #camera, a board named "I love cameras", a vendor named "ABC Cameras", etc. However, for example, Best Buy® may agree to pay a lower fix cost (e.g., $0.50) for the same advertisement on the same website each time the advertisement is displayed near where words like "photography" or "photos" are mentioned and similarly, it may agree to pay an even lower amount (e.g., $0.25) when the same advertisement is placed on the same website each time the advertisement is displayed near where other relevant words like "birthday", "wedding", etc., are mentioned, and so forth.

In another embodiment, action costs may be determined by action cost logic 213 based any number and type of other factors, such as the nature of the action taken by the end-user of the website, such as software application 261, at computing device 260. For example, continuing with Best Buy®, they may agree to pay a high action cost (e.g., $1.00) if the end-user's action leads to a purchase at their website, such as the user clicks on their camera pin advertisement and ends up purchasing a camera at Bestbuy.com®. Similarly, Best Buy® may agree to pay a slightly smaller amount (e.g., $0.80) if the action does not lead to a camera purchase; rather, the end-user up purchasing a different product (such as a printer) from Bestbuy.com®. Continuing with the example, Best Buy® may agree to this descending action cost structure based on user actions, such as agreeing to lowering the action cost if the user merely browses Bestbuy.com® without any purchases or simply re-pins the advertisement, "likes" the advertisement, comments on the advertisement, clicks on the advertisement, makes the advertisement bigger or smaller, and so forth, as illustrated with respect to FIGS. 3A-3B.

In some embodiments, the user may choose to share the advertisement (such as emailing it to a friend or posting it on another website, such as Facebook®, Twitter®, etc.) which may or may not lead to a purchase, etc., at the advertiser's website. Such sharing of the advertisement may then be applied to one or more action cost criteria, such as the ones mentioned above with regard to the Best Buy® example, for computing action costs by action cost logic 213.

Further, in some embodiments, auction-like techniques may be applied for determining action costs that the advertisers are willing to pay and the service provider (e.g., Salesforce®) is willing to accept. For example, a clearing price-like auction may be used to conduct an auction for a number of advertisers for a certain number and type of advertising spots on one or more websites to determine action costs as facilitated by action cost logic 213. For example, in a clearing price auction, a clearing price (e.g., action cost) may be assigned after the potential advertisers have completed the bidding and asking process, where the clearing price represents the highest negotiated price that the advertiser is willing to pay and the lowest negotiated price that the service provider is willing to accept.

In one embodiment, evaluation/decision logic 217 may be used to facilitate evaluation of the one or more advertisement, advertisement contents, website contents, advertisers, etc., based on their overall expected revenues, one or more individual factors (e.g., cost per action, action rate, etc.), and/or any number and type of other factors (e.g., content being inappropriate or illegal, etc.). For example, upon evaluation, an advertisement may be rejected and its advertiser may be informed as such if, for example, its expected revenue is determined to be sufficiently or unacceptably low and, in some embodiments, an advertisement may be rejected simply for its content (e.g., content being inappropriate, illegal, untimely, etc.). Further, for example, upon evaluation, an advertisement may be accepted to be selected for a placement on a website and/or, in some embodiments, the advertisement may be decided to be selected to be put in a queue to then be selected for placement on the website using one or more selection techniques (e.g., roulette selection, etc.), as will be further described with reference to placement/selection logic 219.

Now referring to placement/selection logic 219, in one embodiment, any number of advertisers may be placed in one or more queues or groups and then selected based on one or more techniques, such as roulette selection, deterministic selection, etc. Although it is contemplated that given the nature of the aforementioned formula for estimating expected reference, it is unlikely to have two or more advertisers ending up in a tie where a tie breaker is needed; nevertheless, in some embodiments, a combination of placement and selection techniques may be applied and used by placement/selection logic 219 to ensure that the processes of selection of advertisers and placement of their advertisements is run dynamically, continuously, and seamlessly. For example, if there are 5 advertisers (e.g., flower vendors, hardware stores, etc.) having an equal score of 20% representing their expected revenue, then, in one embodiment, a roulette selection technique may be applied such that each of the 5 advertisers is randomly selected for placement of its advertisement on one or more websites and, in some embodiments, this may continue until one of their scores changes.

Now, if, for example, one of the 5 advertisers scores 2% but the other 4 advertisers obtain an equal score of 1% each, then, in one embodiment, a deterministic selection technique may be applied such that the one advertiser with 2% (being the highest score) is given a priority in the queue and its advertisement is placed first on one or more websites. However, in one embodiment, after having selected the advertiser with the highest score, the roulette selection may then be applied to the other 4 advertisers where each advertiser may be randomly selected until there is a chance in one of their scores.

It is contemplated and to be noted that the scoring technique for any of the factors, such as expected revenue, is not limited to merely percentages or any particular unit of measurement, and that any number and type of scoring techniques employing any units of alphabets, numbers, characters, etc., in any sequence (e.g., ascending, descending, progressive scale, regressive scale, etc.) may be applied for scoring purposes for associating priorities and/or placement ranks with advertisers. This use of percentages here is merely an example for brevity, clarity, and ease of understanding. For example, various scoring techniques may employ numbers (e.g., 1, 7, 555, etc.), placement numbers (e.g., $1^{st}$, $5^{th}$, $102^{nd}$, etc.), alphabets (e.g., A, D, J, etc.), words (e.g., high, medium, low, very low, etc.), decision words (e.g., accepted, rejected, more data needed, etc.), characters (e.g., smile, frown, star, etc.), etc. It is further contemplated that the actual revenue or the expected revenue may be computed in one or more currencies, such as United States Dollar, British Pound, Japanese Yen, Pakistan Rupee, Mexican Peso, etc.

Communication/compatibility logic 221 may facilitate the ability to dynamically communicate and stay configured with any number and type of software/application developing tools, models, data processing servers, database platforms and architectures, programming languages and their corresponding platforms, etc. Communication/compatibility logic 221 further facilitates the ability to dynamically communicate and stay configured with various computing devices (e.g., server computing device, mobile computing devices, such as smartphones, tablet computers, laptop, etc.), databases, repositories, networks (e.g., cloud network, intranet, the Internet, proximity network, such as Bluetooth®, WiFi®, etc.), websites (e.g., social/business networking websites, such as Chatter®, Facebook®, LinkedIn®, Google+®, Twitter®, etc.), etc., while ensuring compatibility with changing technologies, parameters, protocols, standards, etc.

It is contemplated that any number and type of components may be added to and/or removed from smart mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3A:
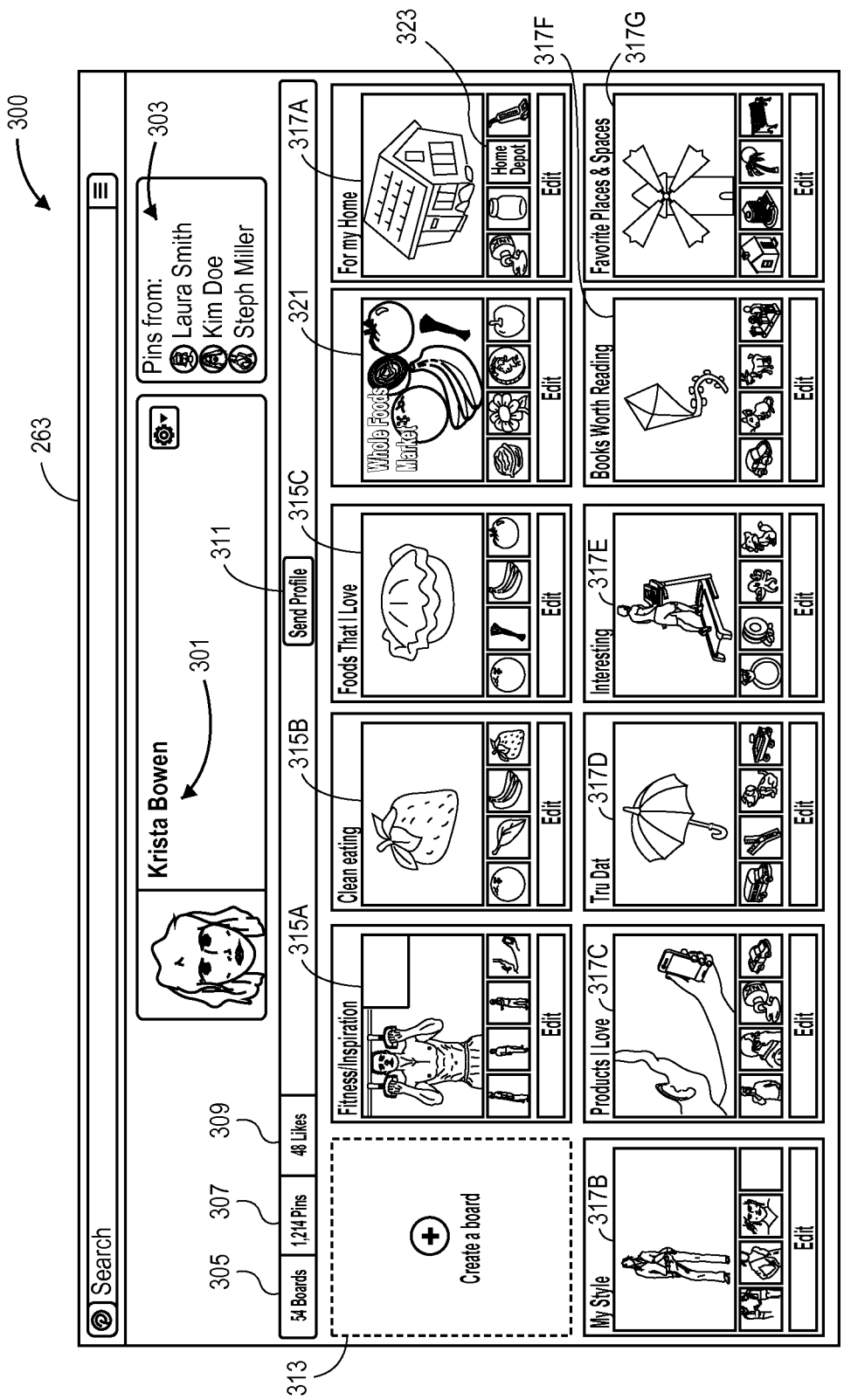
FIGS. 3A and 3B illustrate screenshots of advertisements according to one embodiment.
Figure 3B:
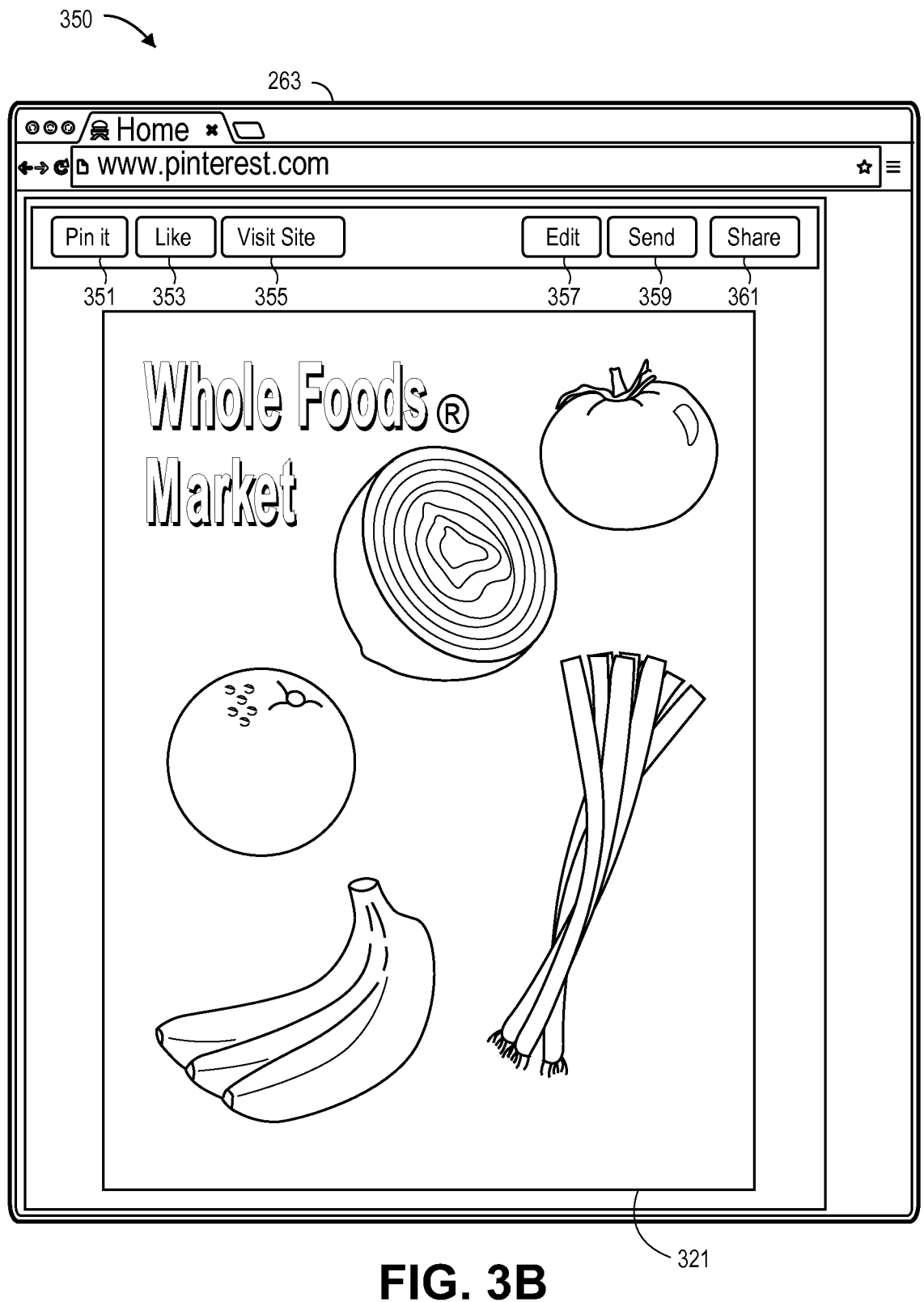

FIGS. 3A and 3B illustrate screenshots 300, 350 of advertisements 321, 323 according to one embodiment. It is to be noted that for the sake of brevity, various details already discussed with reference to FIGS. 1-2 are not repeated hereafter. For example, many of the details of curated content websites, such as Pinterest.com®, shown as software application 261, computing devices, such as computing devices 100, 240, 260, etc., smart mechanism 110 of FIG. 2, etc., may not be discussed hereafter. Furthermore, as aforementioned, it is to be noted that embodiments are not limited to any particular number or type of websites, computing devices, user interfaces, advertisements, advertisers, etc., and thus any contents of the illustrated embodiments are shown and used here as examples for the sake of brevity, clarity, and ease of understanding.

Referring to FIG. 3A, screenshot 300 shows a Pinterest.com® webpage via user interface 263 (e.g., web browser, etc.) of computing device 260 of FIG. 2. The webpage at Pinterest.com® is shown to be associated with a user/participants having user profile 301 and the website's other users/participants form whose profiles the user may have received pins 303. It is further shown that the user's profile 301 currently holds any number of boards 305, pins 307, and pin likes 309 of one or more pins. The illustrated option of send profile 311 may be used by the user to send the user's profile 301 to any number of other users of the website.

The webpage further illustrates that profile 301 includes any number and type of boards having a number and type of pins, such as boards 315A-315C, 317A-317G, etc., and even a space, such as space 313, dedicated to create and add a new board. For example, as illustrated, boards 317-A-317G relate to a variety of interests, ranging from home to style to books, etc., while boards 315A-315C are more narrow in interest as they primarily refer to health and food, such as board 315A relates to "fitness/inspiration", board 315B relates to "clean eating", and board 315C relates to "foods thee I love", etc.

In one embodiment, as further discussed with reference to FIGS. 1-2, smart advertisement 110 of FIG. 2 may be triggered to facilitate an advertisement, such as advertisement 321, that is relevant to the user's interest in healthy eating may be intelligently placed on the user's webpage within, for example, a proximity of the relevant boards, such as boards 317A-317G. In illustrated embodiment, advertisement 321 (e.g., Whole Foods®) may be referred to as board advertisement such that is nearly the size of a typical Pinterest® board. As further illustrated, in one embodiment, board 317A includes advertisement 323 (e.g., Home Depot®) which may be referred as pin advertisement such that it is nearly the size of a typical Pinterest® pin. As previously discussed, embodiments are not limited to any particular number, type, size, or location of advertisements and that advertisements 321, 323 are illustrated as examples for the sake of brevity, clarity, and ease of understanding.

Now referring to FIG. 3B, in one embodiment, advertisement 321 may be further explored when it is clicked on, such as by the user for any number of reasons, such as curiosity, intentionally, unintentionally or by mistake, etc. In one embodiment, the clicking of advertisement 321 of FIG. 3A may facilitate advertisement 321 to get bigger in size and open on another webpage or tab of the website accessed via user interface 263 as shown in screenshot 350 of FIG. 3B. Further, in one embodiment, additional options 351-361 may be provided to the user to further explore and use advertisement 321. For example, in some embodiments, advertisement 321 may be pinned or re-pinned using pin it 351, liked using like 353, edited using edit 357, sent to others using send 359, shared with others using share 361.

With regard to sending or sharing of advertisement 321, in one embodiment, it may be sent to or shared via email, such as by clicking on send 359, posted on a networking website, such as Twitter®, Facebook®, LinkedIn®, etc., by clicking on share 361, etc., without being limited to be sent or shared with merely the other users or participants of the website (e.g., Pinterest.com®, etc.), but that advertisement 321 may be sent to or shared with any number and type of others users and/or their accounts (such as via email applications (e.g., Gmail®, Outlook®, etc.), short message service ("SMS") or text applications, networking websites, blogs, business websites, etc.) of any number and type of individuals, groups, businesses, etc.

In one embodiment, other options, such as visit site 355, may also be provided which may be used by the user to visit the website of the advertiser associated with advertisement 321. For example, continuing with Whole Foods®, the user may choose to click on visit site 355 to visit Wholefoods.com® to further review and learn about the organization's products, services, etc. As discussed in greater detail with regard to FIG. 2, in one embodiment, such activities (e.g., vising the organization's website being initiated from advertisement 321, pining, repining, editing, sending, sharing, etc., of advertisement 321, etc.) may be closely considered for estimating various factors, such as probability of relevance, action rate, etc., as, in some embodiments, such activities may result in or regarded as increasing the probability of relevance, action rate, expected revenue, etc., relating to advertisement 321.

In some embodiments, these activities may also be considered for other similar or related advertisers, such as Sprouts®, etc., as facilitated by computation engine 207 of smart mechanism 110 of FIG. 2. Furthermore, any of such activities may be dynamically detected, accessed, obtained, and stored at one or more repositories, such as database(s) 230 of FIG. 2, for real-time estimation and/or subsequent uses by computation engine 207 of FIG. 2 for dynamically and continuously estimating expected revenues relating to advertisement 321 and/or other advertisements, advertisers, etc.

Figure 4:
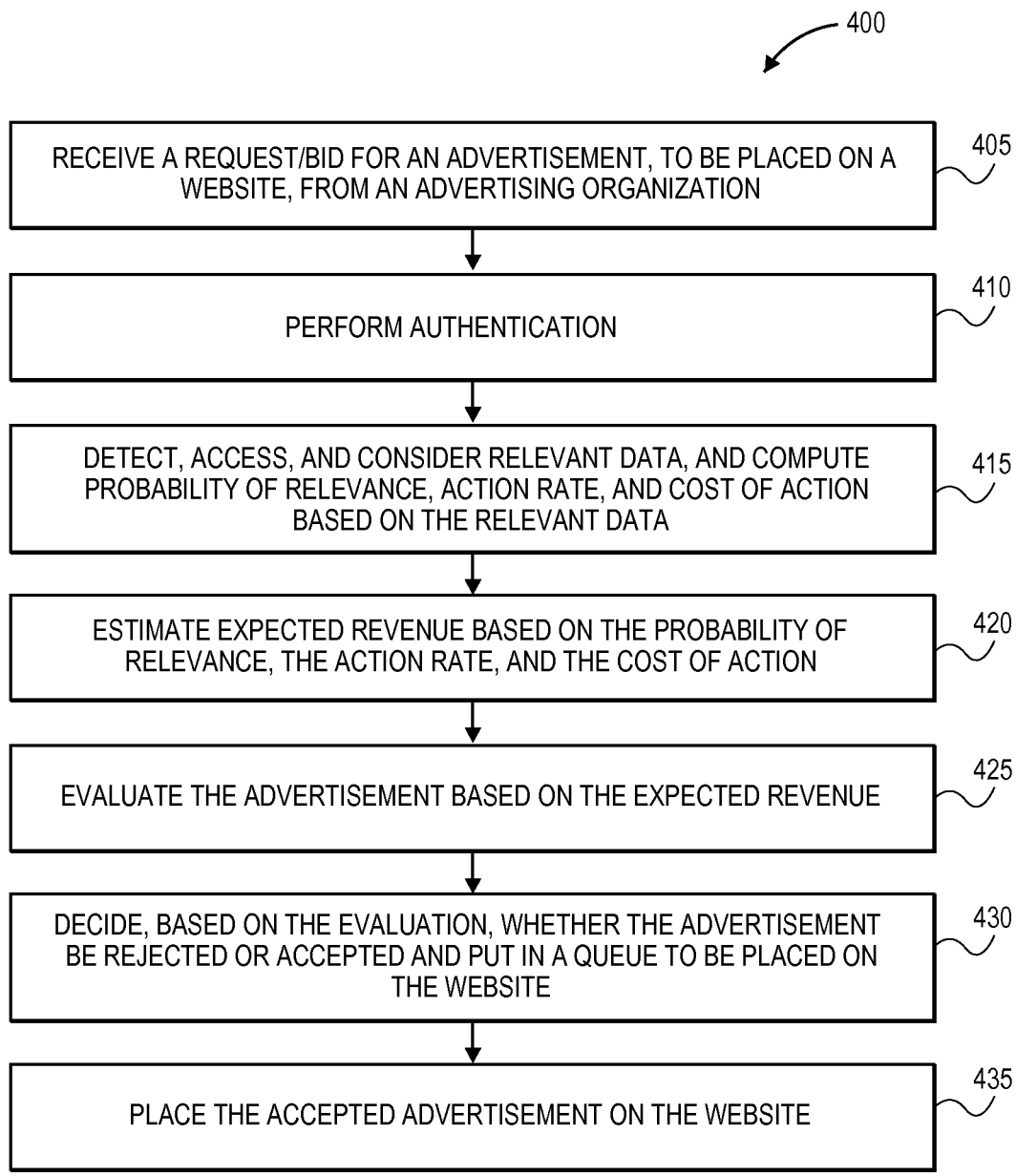
FIG. 4 illustrates a method for facilitating dynamic smart advertising at curated content websites according to one embodiment.

FIG. 4 illustrates a method 400 for facilitating dynamic smart advertising at curated content websites according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by smart mechanism 110 of FIG. 2. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3B may not be repeated or discussed hereafter.

Method 400 begins at block 405 with receiving, by and incorporated within a database system, a request/bid for an advertisement, associated with an organization (serving to be an advertiser), to be placed on a website (e.g., curated content website, such as Pinterest.com®). The request/bid may have been placed by a user on behalf of the advertiser using one or more computing devices (e.g., third-party server computer associated with or hosted by the advertising organization) and received at a computing device (e.g., server computer) associated with or hosted by a host organization (e.g., service provider, such as Salesforce®). Upon receiving the request/bid, one or more of the advertiser, the advertiser's representative, the advertiser's computing device, etc., may be authenticated at block 410.

At block 415, upon successful authentication, in one embodiment, any amount and type of relevant data may be detected, accessed, or obtained from one or more sources, such as the advertiser, the representative of the advertiser, the website where the advertisement is requested to be placed, one or more databases, such as database(s) 230 of FIG. 2, etc. As previously described with reference to reception detection logic 201 and its access module 203 of FIG. 2, for example, some of the information, such as an advertising budget, etc., may be obtained from the advertiser while some of the other information may be automatically and dynamically, in real-time, detected at and accessed from one or more of the aforementioned sources, and further, any relevant and available historical data may be obtained from one or more databases, such as database(s) 230 of FIG. 2.

In one embodiment, at block 420, as further described with reference to FIG. 2, computation engine 207 may be used to estimate expected revenue relating to the advertisement (and/or, in some embodiments, the advertiser, other advertisements, other advertisers, etc.) based on one or more factors, such as probability of relevance, action rate, cost of action, etc. At block 425, any evaluations and subsequent decisions regarding this advertisement may be made based on the expected revenue relating to the advertisement, etc., and, in some embodiments, other expected revenues associated with other advertisements, advertisers, etc., may be computed using any number of statistical techniques, such as the Jaccard Index, etc. In one embodiment, at block 430, based on the evaluation, the advertisement may be decided to accepted or rejected and, in one embodiment, at block 435, it may be selected to be accepted and placed in a queue and/or a group to be later placed on the requested website based on one or more selection techniques, such as roulette selection, deterministic selection, etc.

Figure 5:
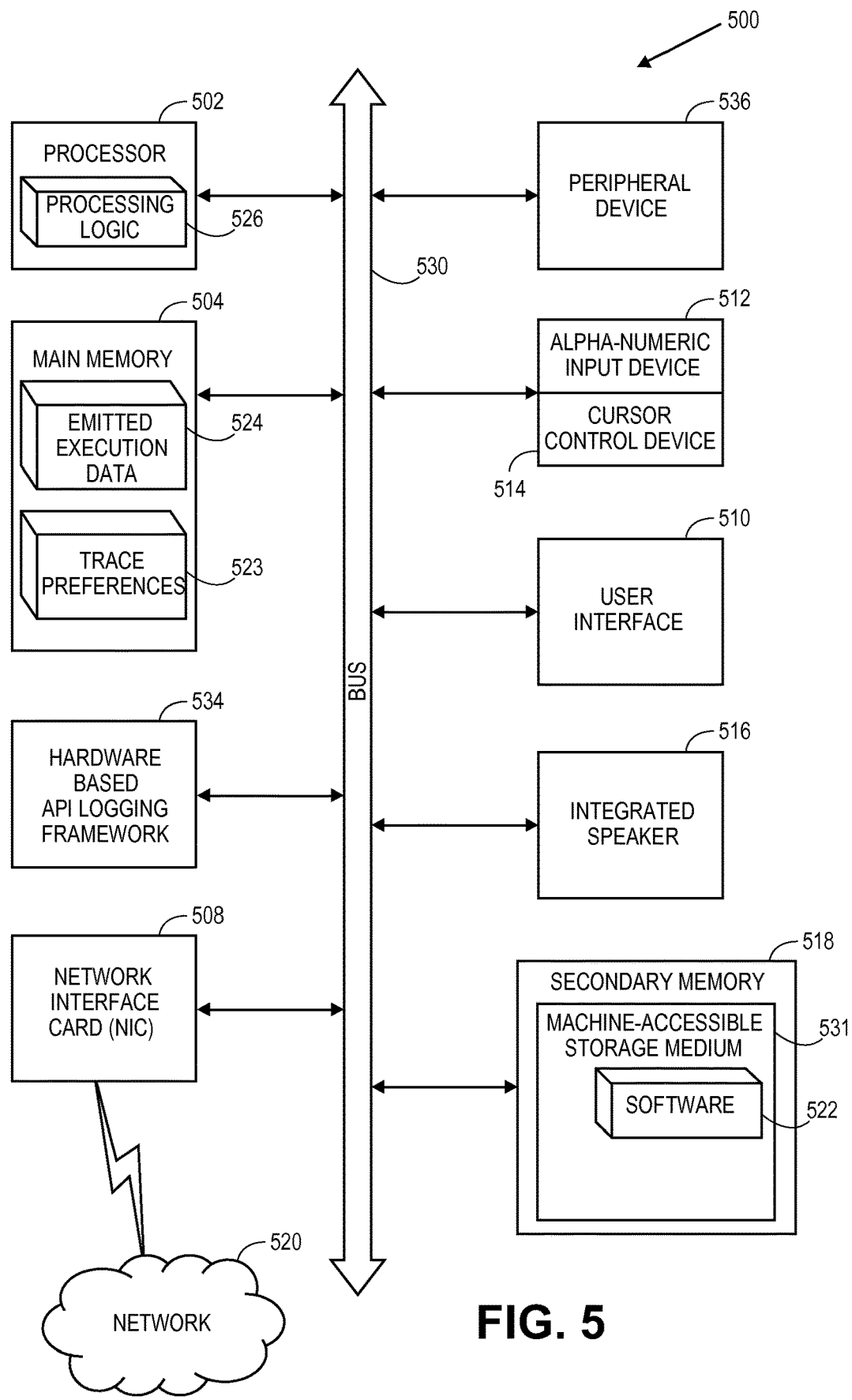
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 100, 240, 260 of FIG. 2. In alternative embodiments, the machine may be connected (e.g., networked) to other machines in a network (such as host machine 100 of FIG. 1 connected with client machine 200 over network 235 of FIG. 2), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets.

Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of smart advertising mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of smart advertising mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
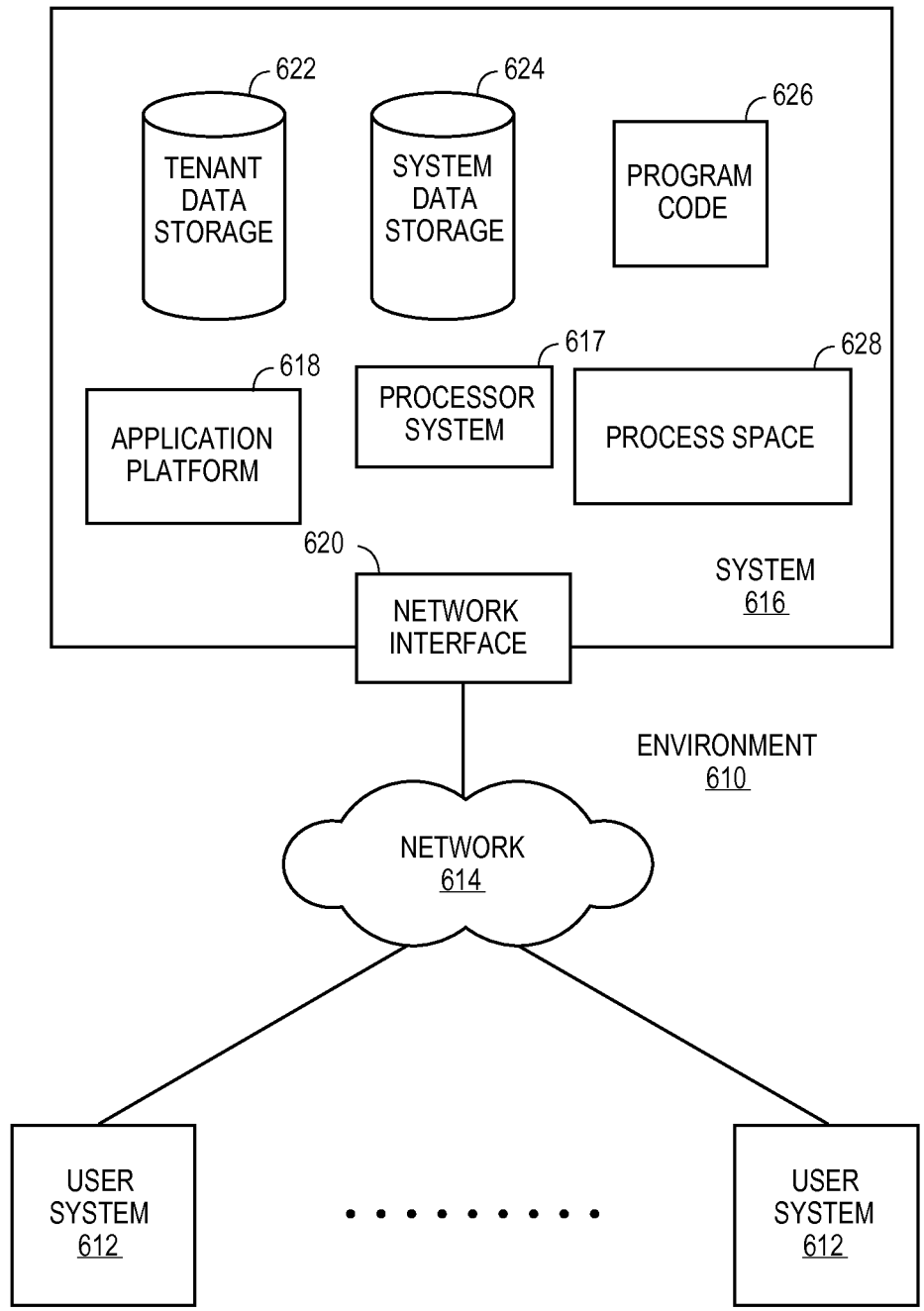
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
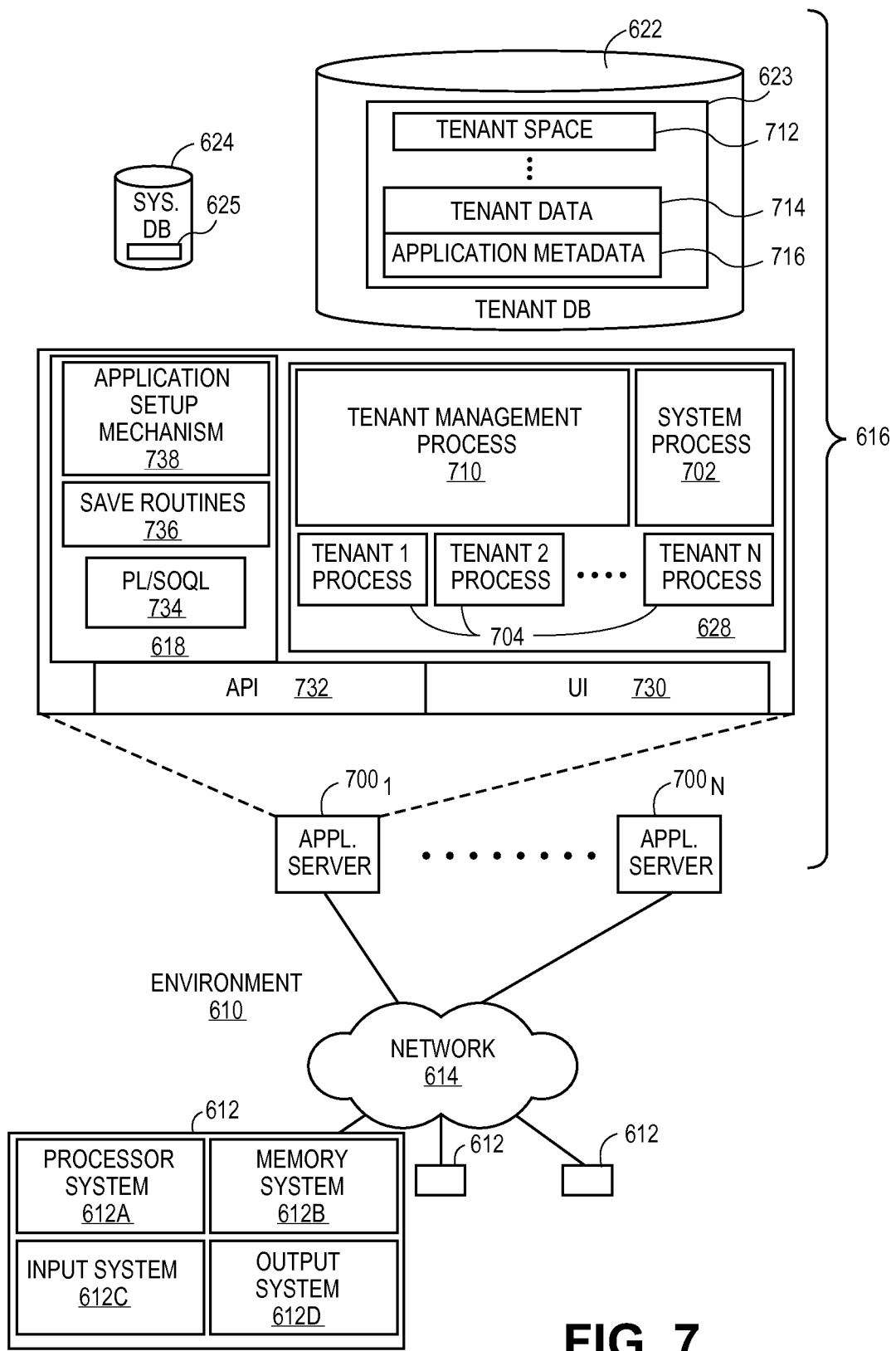
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method for smart placement of advertisements on a webpage as facilitated by an advertising server device, the method comprising:
   identifying, by the advertising server device, contents of the webpage associated with a primary user at a client computing device, wherein the webpage displays a catalog of interests pertinent to the primary user, wherein the interests are represented through images that are pinned or re-pinned on one or more pin-boards at the webpage associated with the primary user, and based on the contents, facilitating discovery and sharing of information and linking the primary user with secondary users through the interests, wherein a pinned image is associated with a primary source of the information and classified as basic traffic at the webpage, and wherein a re-pinned image is associated with a secondary source of the information and classified as bonus traffic at the webpage;

prior to placing an advertisement on the webpage, determining, by the advertising server device, whether the advertisement is to be placed on the webpage by:

classifying a traffic as the basic traffic or the bonus traffic and one or more of:

(a) estimating a probability of relevance of the advertisement to the user based on the basic traffic and the bonus traffic on the webpage;

(b) estimating an action rate of the advertisement based at least in part on the estimated probability of relevance, wherein the action rate is types of frequencies of actions pertaining to the advertisement anticipated to be taken by the user; and (c) estimating a revenue to be obtained from placing the advertisement on the webpage; and upon determining that the advertisement is to be placed on the webpage, based at least in part on the one or more of the estimated probability of relevance, the estimated action rate, and the estimated revenue, placing, by the advertising server device, the advertisement on the webpage.

2. The method of claim 1, further comprising determining one or more of current price rates associated with the actions and payments and costs anticipated from the actions, wherein the webpage is displayed on a website comprising a curated content-based networking web site.

3. The method of claim 2, wherein the content includes one or more of primary content obtained from primary sources, and secondary content obtained from secondary sources.

4. The method of claim 2, wherein the probability of relevance is estimated based on one or more of the Jaccard Index, the term frequency-inverse document frequency, and a web search relevance.

5. The method of claim 1, wherein the actions comprise one or more of clicking on the advertisement, pinning or repining the advertisement, liking the advertisement, sending or sharing the advertisement, opening the webpage, browsing the content on the webpage, and shopping on the webpage.

6. The method of claim 2, wherein the current price rates comprise a price tag for an action associated with the advertisement, wherein the price tag includes a fixed price or a dynamic price based on one or more of supply and demand.

7. The method of claim 1, further comprising assigning multiple advertisements to a queue prior to selecting the advertisement for placement on the webpage, wherein the advertisement is placed on the webpage if the estimated revenue is greater than or equal to an expected revenue, wherein the advertisement is not placed on the webpage if the estimated revenue is less than the expected revenue.

8. A database system comprising an advertising server device for smart placement of advertisements on a webpage, the advertising server device having a processing device coupled to a storage device having instructions, the processing device to execute the instructions to perform operations comprising:

identifying contents of the webpage associated with a primary user at a client computing device, wherein the webpage displays a catalog of interests pertinent to the primary user, wherein the interests are represented through images that are pinned or re-pinned on one or more pin-boards at the webpage associated with the primary user, and based on the contents, facilitating discovery and sharing of information and linking the primary user with secondary users through the interests, wherein a pinned image is associated with a primary source of the information and classified as basic traffic at the webpage, and wherein a re-pinned image is associated with a secondary source of the information and classified as bonus traffic at the webpage;

prior to placing an advertisement on the webpage, determining, by the advertising server device, whether the advertisement is to be placed on the webpage by:

classifying a traffic as the basic traffic or the bonus traffic and one or more of:

(a) estimating a probability of relevance of the advertisement to the user based on the basic traffic and the bonus traffic on the webpage;

(b) estimating an action rate of the advertisement based at least in part on the estimated probability of relevance, wherein the action rate is types of frequencies of actions pertaining to the advertisement anticipated to be taken by the user; and (c) estimating a revenue to be obtained from placing the advertisement on the webpage; and upon determining that the advertisement is to be placed on the webpage, based at least in part on one or more of the estimated probability of relevance, the estimated action rate, and the estimated revenue, placing the advertisement on the webpage.

9. The database system of claim 8, wherein the operations comprise determining one or more of current price rates associated with the actions, and payments and costs anticipated from the actions, wherein the webpage is displayed on a website comprising a curated content-based networking website.

10. The database system of claim 9, wherein the content includes one or more of primary content obtained from primary sources, and secondary content obtained from secondary sources.

11. The database system of claim 9, wherein the probability of relevance is estimated based on one or more of the Jaccard Index, the term frequency-inverse document frequency, and a web search relevance.

12. The database system of claim 8, wherein the actions comprise one or more of clicking on the advertisement, pinning or repining the advertisement, liking the advertisement, sending or sharing the advertisement, opening the webpage, browsing the content on the webpage, and shopping on the webpage.

13. The database system of claim 9, wherein the current price rates comprise a price tag for an action associated with the advertisement, wherein the price tag includes a fixed price or a dynamic price based on one or more of supply and demand.

14. The database system of claim 8, wherein the operations comprise assigning multiple advertisements to a queue prior to selecting the advertisement for placement on the webpage, wherein the advertisement is placed on the webpage if the estimated revenue is greater than or equal to an expected revenue, wherein the advertisement is not placed on the webpage if the estimated revenue is less than the expected revenue.

15. A non-transitory machine-readable medium comprising a plurality of instructions which, when executed by a processing device, cause the processing device to perform operations comprising:
   identifying contents of the webpage associated with a primary user at a client computing device, wherein the webpage displays a catalog of interests pertinent to the primary user, wherein the interests are represented through images that are pinned or re-pinned on one or more pin-boards at the webpage associated with the primary user, and based on the contents, facilitating discovery and sharing of information and linking the primary user with secondary users through the interests,
   wherein a pinned image is associated with a primary source of the information and classified as basic traffic at the webpage, and wherein a re-pinned image is associated with a secondary source of the information and classified as bonus traffic at the webpage;
   prior to placing an advertisement on the webpage, determining, by the advertising server device, whether the advertisement is to be placed on the webpage by:
   classifying a traffic as the basic traffic or the bonus traffic and comprises one or more of:
      (a) estimating a probability of relevance of the advertisement to the user based on the basic traffic and the bonus traffic on the webpage;
      (b) estimating an action rate of the advertisement based at least in part on the estimated probability of relevance, wherein the action rate is types of frequencies of actions pertaining to the advertisement anticipated to be taken by the user; and
      (c) estimating revenue to be obtained from placing the advertisement on the webpage; and
   upon determining that the advertisement is to be placed on the webpage, based at least in part on one or more of the estimated probability of relevance, the estimated action rate, and the estimated revenue, placing the advertisement on the webpage.

16. The machine-readable medium of claim 15, wherein the operations comprise determining one or more of current price rates associated with the actions, and payments and costs anticipated from the actions, wherein the webpage is displayed on a website comprising a curated content-based networking website.

17. The machine-readable medium of claim 16, wherein the content includes one or more of primary content obtained from primary sources, and secondary content obtained from secondary sources.

18. The machine-readable medium of claim 16, wherein the probability of relevance is estimated based on one or more of the Jaccard Index, the term frequency-inverse document frequency, and a web search relevance.

19. The machine-readable medium of claim 15, wherein the actions comprise one or more of clicking on the advertisement, pinning or repining the advertisement, liking the advertisement, sending or sharing the advertisement, opening the webpage, browsing the content on the webpage, and shopping on the webpage.

20. The machine-readable medium of claim 16, wherein the current price rates comprise a price tag for an action associated with the advertisement, wherein the price tag includes a fixed price or a dynamic price based on one or more f supply and demand.

21. The machine-readable medium of claim 15, wherein the operations comprise assigning multiple advertisements to a queue prior to selecting the advertisement for placement on the webpage, wherein the advertisement is placed on the webpage if the estimated revenue is greater than or equal to an expected revenue, wherein the advertisement is not placed on the webpage if the estimated revenue is less than the expected revenue.

* * * * *